(12) United States Patent
Carbonero

(10) Patent No.: US 6,543,777 B2
(45) Date of Patent: Apr. 8, 2003

(54) BASE FOR GAME STANDARD

(75) Inventor: Kurt K. Carbonero, Rochester, MI (US)

(73) Assignee: Pull-Buoy, Inc., Sterling Heights, MI (US)

( * ) Notice: Subject to any disclaimer, the term of this patent is extended or adjusted under 35 U.S.C. 154(b) by 0 days.

(21) Appl. No.: 09/760,233

(22) Filed: Jan. 12, 2001

(65) Prior Publication Data

US 2002/0093139 A1 Jul. 18, 2002

(51) Int. Cl.[7] .................................................. F41J 1/10
(52) U.S. Cl. ............... 273/407; 248/346.01; 248/176.1; 40/606; 273/402
(58) Field of Search .................. 273/407, 395–402, 273/195, 185, 180, 170; 40/606–610; 248/176.1, 346.01, 346.03, 346.04, 346.5, 910, 519, 523, 309.1, 314

(56) References Cited

U.S. PATENT DOCUMENTS

| | | | | |
|---|---|---|---|---|
| 1,419,554 A | * | 6/1922 | Ganse | 273/400 |
| 2,533,904 A | * | 12/1950 | Urban | 273/400 |
| 3,467,388 A | * | 9/1969 | Weiler | 273/123 R |
| 3,582,078 A | * | 6/1971 | Katras et al. | 273/394 |
| 4,079,939 A | * | 3/1978 | Raistakka | 273/402 |
| 4,204,678 A | * | 5/1980 | Weis | 473/423 |
| 5,348,291 A | * | 9/1994 | Scully | 473/454 |
| 5,395,122 A | * | 3/1995 | Kraemer | 273/400 |
| 5,402,999 A | * | 4/1995 | Keehn, Sr. | 160/135 |
| 5,685,542 A | * | 11/1997 | Weis | 473/459 |
| 5,755,419 A | * | 5/1998 | Gearhart et al. | 248/176.1 |
| 5,878,518 A | * | 3/1999 | Grewe | 248/910 |

* cited by examiner

*Primary Examiner*—Mark S. Graham
(74) *Attorney, Agent, or Firm*—Reising, Ethington, Barnes, Kisselle, Learman & McCulloch, PC

(57) ABSTRACT

A dome-shaped base for a game standard is adapted to support a variety of game standards. The base includes a body defining an elongated standard hole for receiving an elongated standard such as a pole or an elongated tube. The standard hole is oriented substantially in a vertical direction through the body. The body further defines a slot having a substantially horizontal bottom surface and spaced apart vertical surfaces extending away from the horizontal surface. The slot is adapted to support a hoop in a vertical orientation.

5 Claims, 3 Drawing Sheets

BASE FOR GAME STANDARD

TECHNICAL FIELD

The subject invention relates to a base for supporting a game standard such as a pole or a hoop.

BACKGROUND OF THE INVENTION

People skilled with gym equipment and sporting goods are familiar with the use of various bases for supporting upright standards such as poles and hoops. These standards can be used by themselves for a variety of purposes, or they can be used to support nets, flags, and horizontal bars. Until recently, separate bases were used to support pole-shaped standards, on the one hand, and hoops on the other. In fact, hoops occasionally require two bases for support—especially if the bases are made from light-weight foam.

SUMMARY OF THE INVENTION AND ADVANTAGES

A base for a game standard comprises: a body defining an elongated standard hole for receiving an elongated standard, the standard hole being oriented substantially in a vertical direction through the body. The body also defines a slot adapted to support a hoop, with the slot having a substantially horizontal bottom surface and spaced-apart vertical surfaces extending away from the horizontal surface.

This new arrangement provides a durable multi-function product that results in versatility and lower cost.

FIGURES IN THE DRAWINGS

The present invention will now be described, by way of example, with reference to the accompanying drawings, in which.

DESCRIPTION OF THE PREFERRED EMBODIMENT

Figure 1:
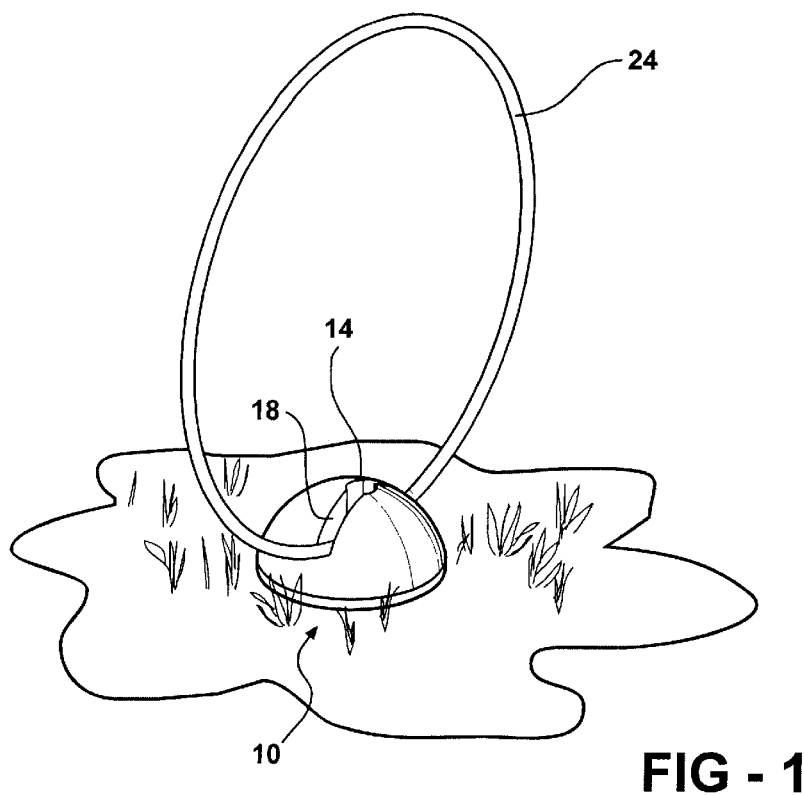
FIG. 1 is a perspective view of the base shown supporting a hoop.
Figure 2:
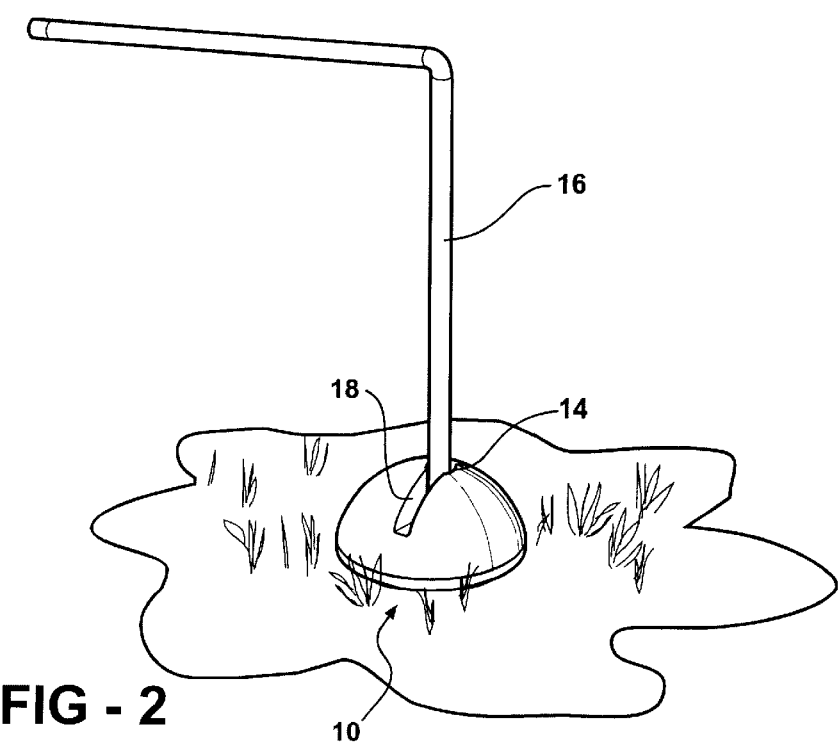
FIG. 2 is a perspective view of the base supporting a game standard pole.

The present invention will now be described, by way of example, with reference to the accompanying drawings in which the base for a game standard is generally shown at 10.

The base 10 generally includes a body generally indicated at 12 defining an elongated standard hole 14 for receiving an elongated standard such as a pole or an elongated tube 16. The standard hole 14 is oriented substantially in a vertical direction through the body 12. The body 12 further defines a slot 18 having a substantially horizontal bottom surface 20 and spaced apart vertical surfaces 22 extending away from the horizontal surface 20. The slot 18 is adapted to support a hoop 24 in a vertical orientation.

Figure 3:
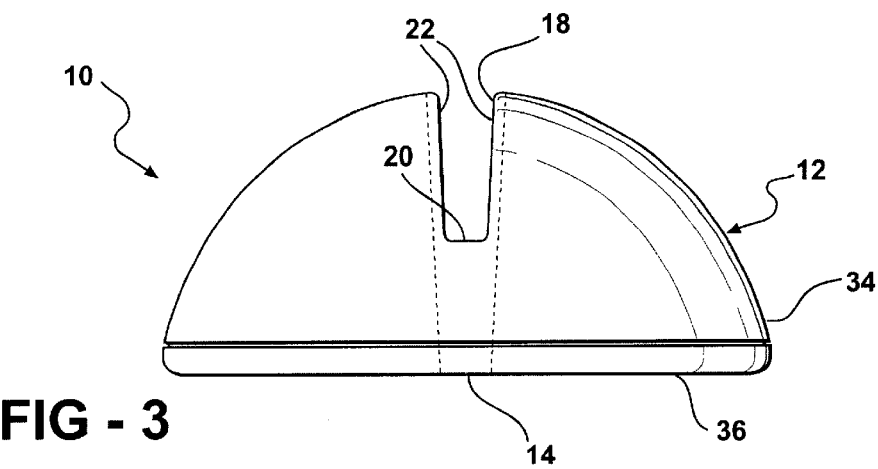
FIG. 3 is a side view of the base showing the slot and the standard hole (in phantom)
Figure 6:
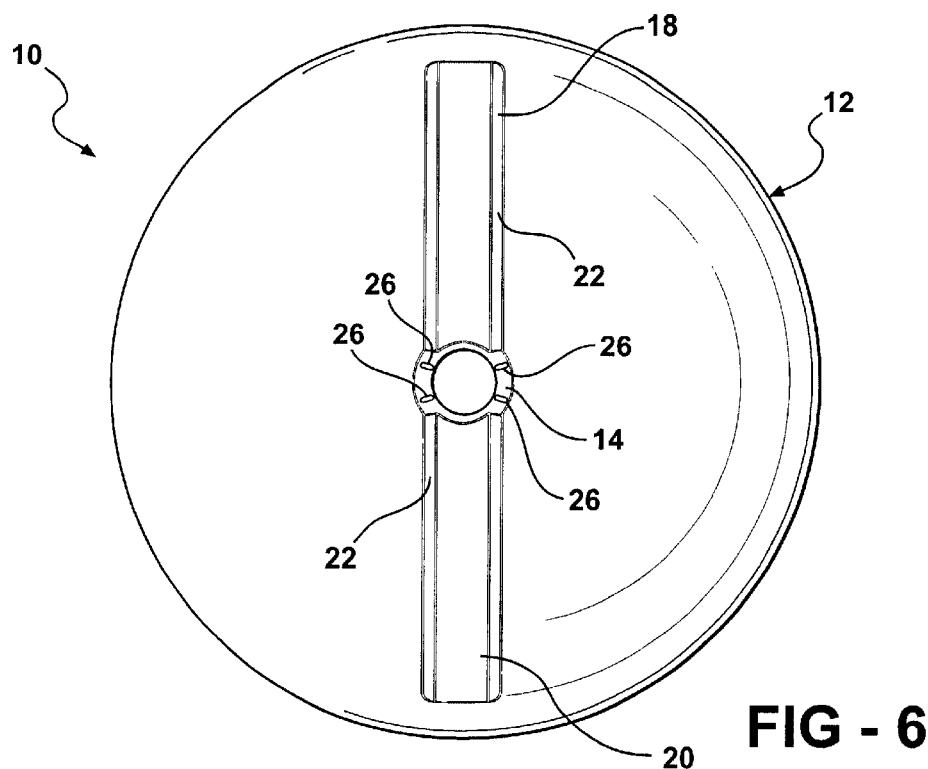
FIG. 6 is a plan view of the base showing the standard hole and the slot.

The base 10 is designed to support a variety of hoop and pole sizes. For example, FIGS. 3 and 6 show that the vertical surfaces 22 of the slot 18 angle away from each other as they extend away from the horizontal surface 20. This allows the base 10 to support hoops 24 having a variety of tube diameters. Similarly, the elongated standard hole 14 is slightly tapered, as shown in FIGS. 3 and 6, to support poles or tubes 16 having a range of diameters. In the illustrated embodiment, the elongated standard hole 14 extends completely through the body; and the standard hole 14 is wider than the slot 18.

Figure 4:
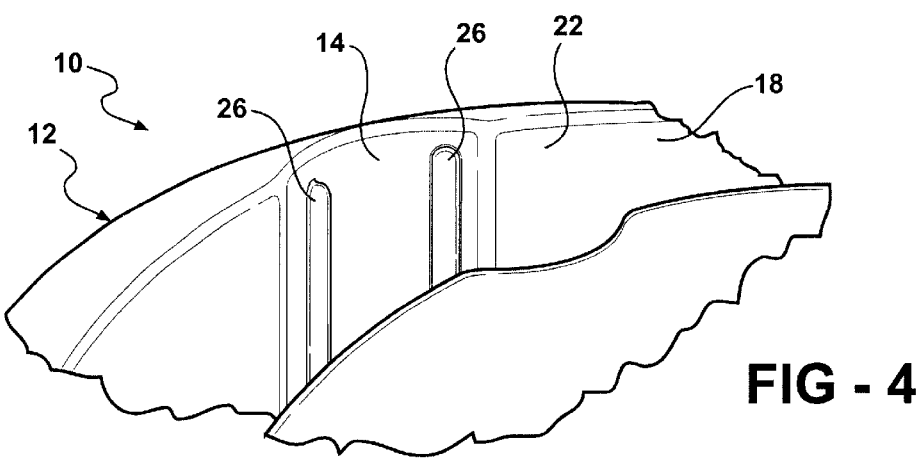
FIG. 4 is a perspective view of the top of the base showing the slot, the standard hole, and the ribs.

As shown in FIGS. 4 and 6, the base 10 also includes a plurality of ribs 26 extending vertically—i.e. axially—along the standard hole 14 for gripping the standard pole 16. These ribs 26 also allow for the use of poles and tubes 16 that have a range of diameters.

Figure 5:
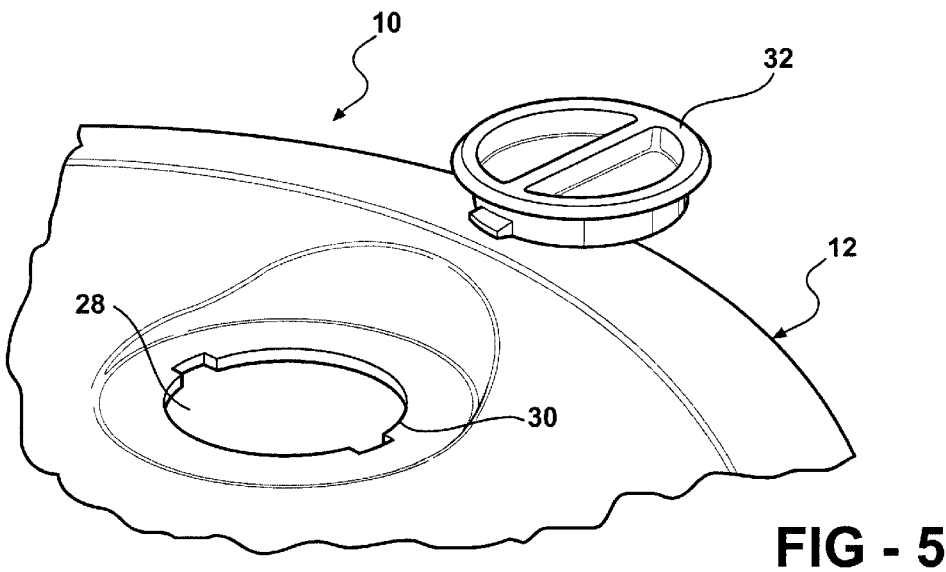
FIG. 5 is a perspective view of the bottom of the base showing the fill hole and the removable cover cap.
Figure 7:
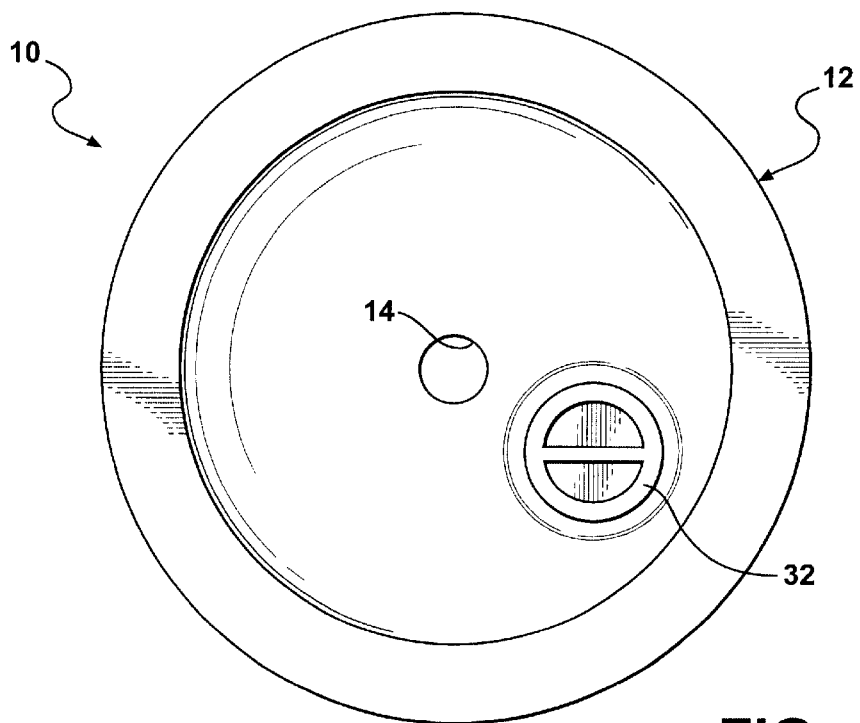
FIG. 7 is a bottom view of the base showing the standard hole and the fill hole.

The body 12 preferably defines a hollow space 28, and further defines a fill hole 30 providing access to the hollow space so that ballast material such as sand or water may be inserted into the hollow space 28. The base 10 also includes a removable cover cap 32 adapted to cover the fill hole 30. As shown in FIGS. 5 and 7, the fill hole 30 is on the bottom of the base 10, but it could be located elsewhere.

The body 12 has the shape of a dome, which, in sports and gym environments, is efficient and streamlined. The body 12 could be more of a block shape, but this involves unnecessary additional material; and the dome shape presents only smooth, rounded surfaces to the field of play.

In the presently preferred embodiment, the base 10 is hollow and is constructed from top and bottom pieces 34, 36 of ABS plastic that are joined together in some suitable manner including fusing, gluing, screwing, or welding. The top piece 34 has the dome shape as best shown in the FIG. 3, with the slot 18 extending through or across the hole 14. The bottom piece 36 has the shape illustrated primarily in FIGS. 3, 5, and 7. As shown particularly in FIGS. 5 and 7, the bottom piece 36 has a concave portion.

Although the description of this invention has been given with reference to a particular embodiment it is not to be construed in a limiting sense. Many variations and modifications will now occur to those skilled in the art.

I claim:

1. A base for a game standard comprising:

a body defining an elongated standard hole for receiving an elongated standard, the standard hole being oriented substantially in a vertical direction through the body wherein the body is adapted to support the standard in a substantially vertical position;

the body further defining a slot adapted to support a hoop having a generally circular cross-section, with the slot having a substantially horizontal bottom surface and spaced apart vertical surfaces extending away from the horizontal surface, and with the vertical surfaces angling away from each other as they extend away from the horizontal surface to present opposed surfaces adapted to contact and grip the hoop, the body having the shape of a dome.

2. The base of claim 1 wherein the elongated standard hole is wider than the slot.

3. The base of claim 1 including a plurality of ribs extending vertically along the standard hole for gripping the elongated standard.

4. The base of claim 1 wherein the standard hole extends completely through the body.

5. A base and hoop combination comprising:

a hoop having a generally circular cross-section;

a body defining an elongated standard hole for receiving an elongated standard, the standard hole being oriented substantially in a vertical direction through the body wherein the body is adapted to support the standard in a substantially vertical position;

the body further defining a slot adapted to support the hoop, with the slot having a substantially horizontal bottom surface and spaced apart vertical surfaces extending away from the horizontal surface, and with the vertical surfaces angling away from each other as they extend away from the horizontal surface.

* * * * *